(12) United States Patent
Keegan et al.

(10) Patent No.: US 10,739,797 B2
(45) Date of Patent: Aug. 11, 2020

(54) CAN OPENER WITH AUTO-SHUTOFF AND METHOD OF OPERATING A CAN OPENER

(71) Applicant: Hamilton Beach Brands, Inc., Glen Allen, VA (US)

(72) Inventors: David Keegan, Richmond, VA (US); Patrick T Mulvaney, Richmond, VA (US); Matthew T Carley, Richmond, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 0 days.

(21) Appl. No.: 15/794,611

(22) Filed: Oct. 26, 2017

(65) Prior Publication Data
US 2019/0129453 A1 May 2, 2019

(51) Int. Cl.
*G05D 19/02* (2006.01)
*G05B 15/02* (2006.01)
*B67B 7/00* (2006.01)
*G01P 13/00* (2006.01)

(52) U.S. Cl.
CPC .............. *G05D 19/02* (2013.01); *B67B 7/38* (2013.01); *G05B 15/02* (2013.01); *G01P 13/00* (2013.01)

(58) Field of Classification Search
None
See application file for complete search history.

(56) References Cited

U.S. PATENT DOCUMENTS

| 3,815,226 | A | * | 6/1974 | Marrie | E02F 3/783 30/421 |
| 3,955,276 | A | * | 5/1976 | Pauty | B67B 7/38 30/421 |
| 4,053,981 | A | * | 10/1977 | Aberer | B67B 7/38 30/419 |
| 5,271,296 | A | * | 12/1993 | Parent | B67B 7/182 81/3.2 |
| 5,647,251 | A | * | 7/1997 | Hardman | B67B 7/182 81/3.2 |
| 6,182,022 | B1 | * | 1/2001 | Mayle | G06F 11/3409 702/182 |
| 6,182,534 | B1 | * | 2/2001 | Hardman | B67B 7/182 81/3.2 |
| 6,739,061 | B1 | * | 5/2004 | Montel | B67B 7/38 30/403 |
| 8,629,937 | B1 | * | 1/2014 | Zhou | H04N 7/014 348/448 |
| 2007/0175051 | A1 | * | 8/2007 | Mah | B67B 7/34 30/401 |
| 2008/0229885 | A1 | * | 9/2008 | Mah | B67B 7/182 81/32 |
| 2013/0342140 | A1 | * | 12/2013 | Weslati | G01P 3/487 318/400.04 |
| 2017/0129664 | A1 | * | 5/2017 | Hatamian | B65D 39/0064 |

* cited by examiner

*Primary Examiner* — Ziaul Karim
(74) *Attorney, Agent, or Firm* — Alexander D. Raring

(57) ABSTRACT

An electric can opener comprises a motor, a controller, and a signal-detecting element monitoring at least one of (i) an audio signal and (ii) a motion-type signal during operation of the can opener. The controller determines a baseline signal value, calculates a threshold signal value and compares the monitored signal value to the calculated threshold value. The controller stops operation of the can opener if the detected signal is outside the threshold from the baseline.

2 Claims, 1 Drawing Sheet

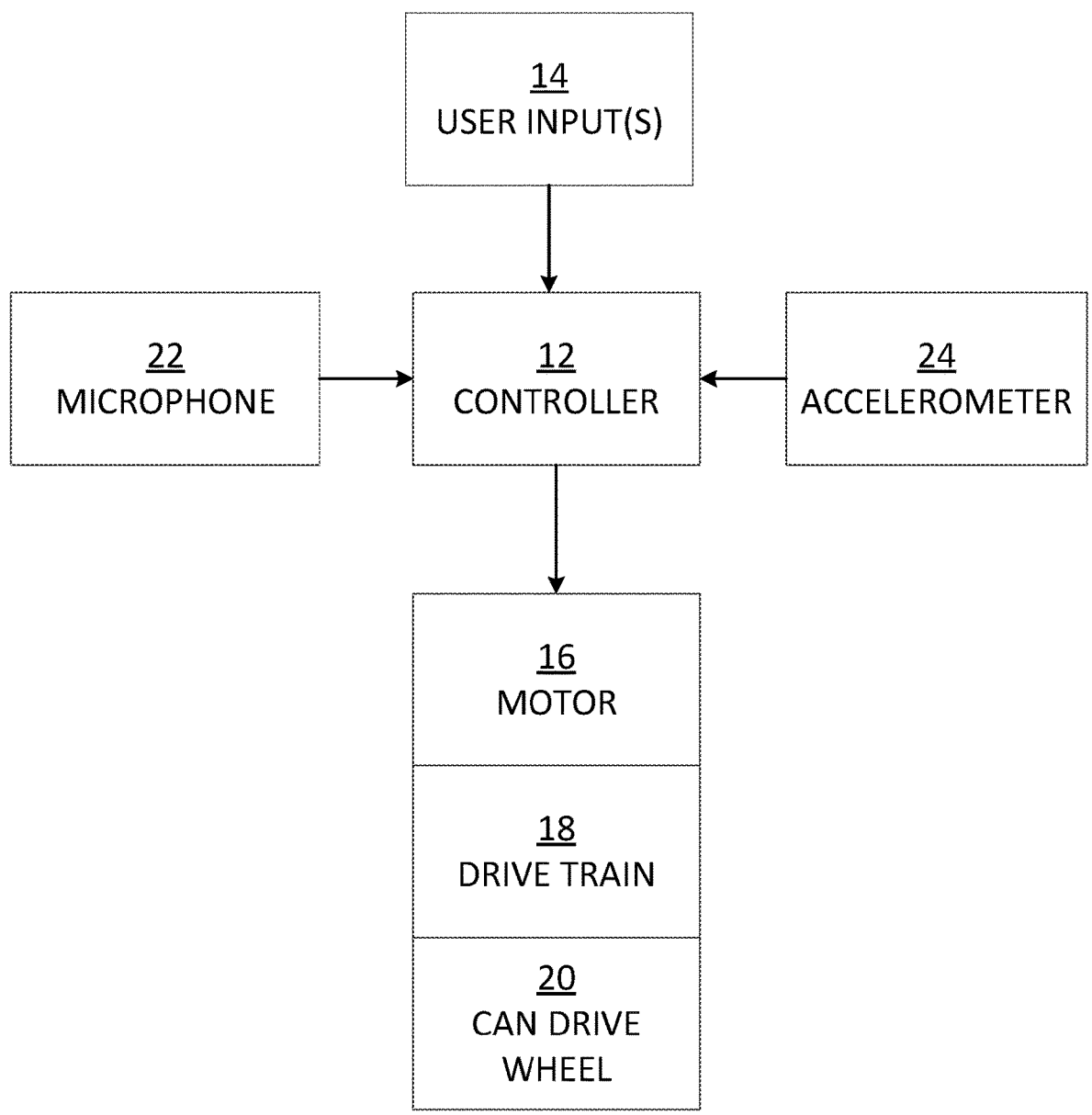

CAN OPENER WITH AUTO-SHUTOFF AND METHOD OF OPERATING A CAN OPENER

BACKGROUND OF THE DISCLOSURE

The present disclosure relates generally to small appliances, and more particularly to electric can openers.

Electric can openers are a common household appliances that are capable of removing the top of a metal can. Traditional electric, top-cut can openers cut the lid away from the inside of the can leaving sharp edges on the removed lid and the inside diameter of the can. The blade is lowered into place and pierces the lid of the can. The lid typically "holds" the blade in place as the can opener rotates the can so that the lid is cut. Once the cut line reaches back to the original point, the lid is separated from the can and no longer holds the blade in position. The releasing of the blade allows movement of the cutting mechanism, which opens a switch or otherwise signals the can opener to turn off. In this regard, this type of electric can openers has an auto-off feature.

Side cut can openers, also known as seam or rim-cutting type, open the top of a can by cutting the outside seam, or rim, of the can. The blade is in a fixed location on the can opener and does not pierce the upper surface of a can as with a traditional top cut can opener. Side cut can openers provide an alternative method for removing the top of a can wherein sharp edges are not created. However, commercially available side cut can openers do not have a feature to automatically stop the can/motor from rotating upon completion of cutting the lid from the can. As such, a user must monitor the can opener's operation and manually stop the can opener when the cut is complete.

It has heretofore not been discovered how to create an electric side cut can opener with the ability to automatically terminate the opening operation (aka, an "auto-off feature"). The electric can opener of the following disclosure overcomes the above-described disadvantages of conventional electric side cut can openers.

BRIEF SUMMARY OF THE DISCLOSURE

An electric can opener is disclosed herein. In one embodiment of the subject device, an electric can opener comprises a motor, a controller, and a signal detecting element, which is comprised of at least one of (i) an audio-detecting element for detecting an audio-based input or (ii) a motion-detecting element for detecting velocity, vibration, acceleration, or the like during operation of the can opener. The controller compares the detected signal to a signal baseline or threshold. The controller stops operation of the can opener if the detected signal changes by more than a predetermined percentage from the baseline calculated at the start of operation (i.e., determines the signal is outside an established tolerance).

The signal-detecting element detects a signal baseline during an initial period of operation. The signal may be composed of motion-based input including but not limited to, velocity, vibration, or acceleration in one or more direction or audio-based input including, but not limited to, raw audio data, volume of audio data, and/or frequency of audio data. The controller may calculate the signal tolerance by adjusting the baseline signal by a predetermined amount.

The can opener may comprise of one or more of the following: (i) an audio-type signal detecting element and (ii) a motion-type signal detecting element. The controller may compare the detected signal(s) to the baseline(s). The controller may stop operation of the can opener if one or more of the detected signal(s) are outside their respective tolerance(s) from their baseline(s).

A method of controlling an electric can opener comprises at least one of detecting an audio signal during operation of the can opener or detecting a motion-detecting element for detecting vibration or the like during operation of the can opener, comparing the detected audio signal to an audio signal threshold or comparing the detected motion to a motion threshold, and stopping operation of the can opener if the detected audio or motion signal is outside a threshold amount from the respective baseline signal.

Both audio and motion may be detected during operation of the can opener. Both the detected signals may be compared to a respective baseline. Operation of the can opener may be stopped if the detected signal is outside a threshold from the baseline.

BRIEF DESCRIPTION OF THE DRAWING

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 1 is a block diagram of an electric can opener, according to one embodiment of the present disclosure.

DETAILED DESCRIPTION OF THE DISCLOSURE

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Referring to the drawings in detail, wherein like numerals indicate like elements throughout, FIG. 1 illustrates an electric can opener in accordance with a preferred embodiment of the present disclosure. The structural aspects of the can opener of embodiments of the present disclosure are generally the same as for conventional side cut electric can openers, and will not be described in detail herein. Rather, the present disclosure will focus on the operational components and procedures that provide the novel auto-off feature. The can opener 10 of embodiments of the present disclosure comprises a controller 12 for controlling the operation of the can opener 10. The controller 12 may comprise a microprocessor, dedicated or general purpose circuitry (such as an application-specific integrated circuit or a field-programmable gate array), a suitably programmed computing device, or any other suitable means for controlling the operation of the electric can opener 10. The controller 12 receives a signal from a user input 14 to begin operation. The user input signal is typically provided by, but not limited to, a lever or handle (not illustrated) that the user moves from its unlocked position to its locked position to secure a can to the can opener 10. The user input signal to start the cutting cycle may also be accomplished by use of a push button, knob, or similar device. Upon receipt of the signal, the controller 12 activates an electric motor 16, which in turn rotates a can drive wheel 20 via a drive train 18. The drive train 18 typically comprises one or more gears, shafts, etc. The can drive wheel 20 rotates the can against a blade (not illustrated) to sever the lid from the can.

Advantageously, the can opener is provided with a signal detecting device, such as a microphone 22, an accelerometer 24, a hall effect sensor, an optical sensor, other suitable sensor, or any combination of one or more of these items. While the can opener of embodiments of the present disclosure may use any suitable signal monitoring device, the specific components of a microphone and accelerometer will be described herein for simplicity. The microphone 22 (if present) would detect an audio signal during operation of the can opener 10. The accelerometer 24 (if present) detects a motion signal during operation of the can opener 10. The microphone 22 may be placed in any suitable location within, on, or near the housing of the can opener 10. The accelerometer 24 may be placed in any suitable location within, on, or near the housing of the can opener 10.

Generally, the monitored signal is measured during an initial operating period to determine a baseline value of the signal. The baseline signal is used to calculate a tolerance value. The signal tolerance is calculated to be a predetermined amount or percentage above or below the baseline signal value. The predetermined amount/percentage may be different for each signal type, and may vary for different can openers. The signal(s) continue to be measured past the initial operating period, and compared, respectively, to their tolerance(s) from their baseline(s). If the signal(s) detected is outside of the tolerance(s) from the baseline(s), which is indicative of the cutting operation being finished, the controller 10 stops the motor 16. In alternative embodiments of the present disclosure, one or more signals are measured and the can opener is turned off if any, or all, signals are detected to be outside of the tolerance(s) from the baseline(s).

The specific audio and/or motion measurement procedure will now be described for one embodiment of the present disclosure (for simplicity, the procedure will be described only for audio). In one embodiment, the startup time is designated to be one second, such that the noise is not measured during the first one second of operation. The baseline audio, for instance the detected noise, is determined by first counting, as quickly as the controller clock speed allows, the number of local maximums of the noise signal over the 0.5 second interval immediately succeeding the startup time. A local maximum occurs each time the noise signal at time T-1 is greater than the signal at time T and at time T-2 (where T is the most recent measurement time, T-1 is the measurement time immediately preceding T, and T-2 is the measurement time immediately preceding T-1). In alternative embodiments of the present disclosure, a local maximum is only counted if its value exceeds a predetermined threshold. Next, the number of local maximums is determined separately for each of the next seven sequential 0.5 second time intervals. In other words, the number of local maximums is determined for each of eight sequential 0.5 time intervals after the startup time. These eight numbers are then averaged, and that average is used as the baseline audio signal.

The noise level increases when the lid has been completely cut. The baseline noise is scaled up to create a noise threshold. The amount of scaling should be great enough to differentiate the baseline noise but small enough to capture the fairly small noise increase that occurs when the lid has been completely cut. In one embodiment, the baseline noise is scaled up 3% to create the noise threshold (that is, the baseline noise is multiplied by 1.03). It should be understand, depending on the construction of the appliance, that scaling down the audio signal from the baseline may also be necessary to determine a threshold.

Motion, such as a detected vibration level, decreases when the lid has been completely cut. A baseline motion or vibration can be determined in a manner similar to the audio signal baseline described above. The baseline vibration value is scaled down to create a vibration threshold. The amount of scaling should be great enough to differentiate the baseline vibration but small enough to capture the fairly small vibration decrease that occurs when the lid has been completely cut. In one embodiment, the baseline vibration is scaled down 3% to create the vibration threshold (that is, the baseline vibration is multiplied by 0.97). The amount of scaling for the audio and/or motion signal may vary depending on the specific design and components of the can opener. It should be understand, depending on the construction of the appliance, that scaling down the motion signal from the baseline may also be necessary to determine a threshold.

After the baseline value has been determined and scaled to create the signal respective threshold, the number of local maximums of the signal continues to be determined for each subsequent 0.5 second interval (until it has been determined that the cut is complete and the can opener is stopped). After the number of local maximums has been determined for a subsequent 0.5 second interval, a running average is calculated of the number of local maximums for the most recent 0.5 second interval and the preceding seven 0.5 second intervals (that is, a running average of the most recent eight 0.5 second intervals). (In this regard, the first seven running averages will include one or more intervals from the initial operating time.) The running average is compared to the threshold value. If the running average is outside the signal threshold then the operation of the can opener is stopped.

The controller continues to determine the number of local signal maximums for each subsequent 0.5 second interval, calculate a running average, and compare the running average to the threshold value until the running average is outside the signal threshold and the operation of the can opener is stopped.

The specific signal measurement procedure described above may vary as needed or desired. For example, the startup time may be longer or shorter than one second, the intervals may be longer or shorter than 0.5 second, the number of intervals used to calculate the baseline may be greater or fewer than eight, the number of intervals used to calculate the running average may be greater or fewer than eight, and the scaling factor may be greater or less than 3% up (or down for vibration). The specific value can vary depending on variables in the manufacturing and design of the can opener, the type or size of the can being cut, etc.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

That which is claimed:

1. A can opener system comprising:
   a motor connected to a drive train;
   a can drive wheel, the motor operable to rotate the can drive wheel via the drive train;

a controller; and an accelerometer providing a signal to the controller, the controller receiving and determining a baseline signal value from the accelerometer and calculating therefrom a threshold signal value as a predetermined amount of the baseline signal value; and wherein the controller stops operation of the can opener if the signal from the accelerometer is below the threshold signal value.

2. A method of controlling an electric can opener, the method comprising:

initiating a cutting cycle via a user input signal, the cutting cycle comprising activating an electric motor to rotate a can drive wheel via a drive train;

generating a signal value from an accelerometer during the cutting cycle;

monitoring the signal value via a controller;

determining a baseline signal value;

calculating a signal threshold from the detected baseline signal value;

comparing the signal value to the calculated threshold value at repeated intervals; and stopping operation of the can opener if the monitored value from the accelerometer is below the calculated signal threshold value.

\* \* \* \* \*